US012420518B2

(12) United States Patent
Schubring

(10) Patent No.: US 12,420,518 B2
(45) Date of Patent: Sep. 23, 2025

(54) COATER AND EMBOSSER-LAMINATOR PROCESS ROLL CALIBRATION

(71) Applicant: BW Converting, Inc., Green Bay, WI (US)

(72) Inventor: Cory L. Schubring, De Pere, WI (US)

(73) Assignee: BW CONVERTING, INC., Green Bay, WI (US)

( * ) Notice: Subject to any disclaimer, the term of this patent is extended or adjusted under 35 U.S.C. 154(b) by 238 days.

(21) Appl. No.: 18/233,529

(22) Filed: Aug. 14, 2023

(65) Prior Publication Data

US 2024/0083133 A1 Mar. 14, 2024

Related U.S. Application Data

(60) Provisional application No. 63/406,406, filed on Sep. 14, 2022.

(51) Int. Cl.
*B31F 1/07* (2006.01)
*B31F 1/00* (2006.01)

(52) U.S. Cl.
CPC .............. *B31F 1/07* (2013.01); *B31F 1/0096* (2013.01); *B31F 2201/0741* (2013.01); *B31F 2201/0753* (2013.01); *B31F 2201/0779* (2013.01); *B31F 2201/0784* (2013.01)

(58) Field of Classification Search
CPC ................................. B31F 1/07; B31F 1/0096
USPC .......................................................... 226/176
See application file for complete search history.

(56) References Cited

U.S. PATENT DOCUMENTS

| | | | |
|---|---|---|---|
| 3,556,907 A | 1/1971 | Nystrand | |
| 5,279,139 A | 1/1994 | Sturm | |
| 5,415,720 A | 5/1995 | Schonhammer et al. | |
| 5,662,574 A * | 9/1997 | Slotten | F16C 13/024 100/168 |
| 5,785,802 A | 7/1998 | Seki et al. | |
| 5,876,530 A | 3/1999 | Seki et al. | |
| 6,601,282 B1 | 8/2003 | Smitterberg et al. | |
| 6,620,455 B2 | 9/2003 | Mensing et al. | |
| 6,692,602 B1 | 2/2004 | Mensing et al. | |
| 6,694,872 B1 * | 2/2004 | LaBelle | B41F 19/02 101/23 |

(Continued)

FOREIGN PATENT DOCUMENTS

| | | |
|---|---|---|
| CN | 108284136 B | 9/2019 |
| EP | 0399296 A2 | 11/1990 |

(Continued)

*Primary Examiner* — Michael G Lee
(74) *Attorney, Agent, or Firm* — Thompson Coburn LLP

(57) ABSTRACT

Rolls of an embosser laminator unit may be calibrated with an iterative process of moving axial ends of the roll a set incremental distance until contact between the rolls is made and then making a correction to the distance based upon the end of the roll making contact. The rolls may be move an initial position where the faces of the rolls are devoid of contact with each other. One or both of the rolls may be rotated. The distance between the ends of the rolls may be decreased until the faces of the rolls make contact with each other. The distance between the first ends of the rolls may be increased by an incremental amount, and a determination of contact between the faces of the rolls may be made by alternate movement of the rolls by the incremental amount and position prior to contact.

12 Claims, 17 Drawing Sheets

(56) References Cited

U.S. PATENT DOCUMENTS

| | | | | |
|---|---|---|---|---|
| 7,584,698 | B2 | 9/2009 | Biagioni et al. | |
| 11,084,243 | B2 | 8/2021 | Giurlani | |
| 2007/0015648 | A1 * | 1/2007 | Biagiotti | B31F 1/07 492/46 |
| 2007/0283823 | A1 * | 12/2007 | Zeigler | B30B 15/148 100/47 |
| 2007/0285045 | A1 * | 12/2007 | Franz | D21G 1/00 318/799 |
| 2008/0317940 | A1 | 12/2008 | Kohler | |
| 2011/0247391 | A1 | 10/2011 | Seidel et al. | |
| 2014/0044923 | A1 * | 2/2014 | Gelli | A47K 10/16 264/293 |
| 2018/0178498 | A1 * | 6/2018 | Gussert | B32B 37/0053 |

FOREIGN PATENT DOCUMENTS

| | | | |
|---|---|---|---|
| EP | 0985461 | A1 | 3/2000 |
| EP | 1362690 | A1 | 11/2003 |
| EP | 2815815 | A1 | 12/2014 |
| EP | 2842731 | A1 | 3/2015 |
| EP | 3674008 | A1 | 7/2020 |
| WO | 9015679 | A1 | 12/1990 |
| WO | 2025/045511 | A1 | 3/2025 |

* cited by examiner

Torque – rotation torque reference of at least 1 of the rotational axes

Threshold – Configured evaluation threshold to indicate roll contact side 1 / side 2 – Opposite end of the adjustment points for roll nip/gap engagement "x" - an incremental displacement of x units for the adjustment axes. This can be based on the difference between the geometric absolute nip contact position and a position that corresponds to a defined gap that can be used for verification (e.g., 0.010" or 0.005")

MaxIterations – number of times each side should contact in the cycle.

Figure 7B side 1 / side 2 – Opposite end of the adjustment points for roll nip/gap engagement “x” - an incremental displacement of x units for the adjustment axes. This can be based on the difference between the geometric absolute nip contact position and a position that corresponds to a defined gaps that can be used for verification (e.g., 0.010” or 0.005”)

MaxIterations – number of times each side should contact in the cycle.

Side 1 Contact – electrical contact indicated

Side 2 Contact – electrical contact indicated

Figure 22B

COATER AND EMBOSSER-LAMINATOR PROCESS ROLL CALIBRATION

RELATED APPLICATION DATA

This application claims priority benefit to U.S. provisional application Ser. No. 63/406,406 filed Sep. 14, 2022, the disclosure of which is incorporated by reference herein.

BACKGROUND

This disclosure is directed to methods and apparatus for coating, embossing, and laminating, and more particularly toward coaters and embosser-laminators for the production of bathroom tissue and kitchen towel.

It is well known in the art that an offset gravure process can be used for coating one or both sides of a web of tissue or towel product. It is well known in the art that laminating two or more plies of a tissue or towel product together amounts to embossing at least one of the plies, applying a coating of adhesive or water to the embossing protuberances formed on the embossed ply or plies, and then joining the ply or plies with one or more further plies to form a laminated product. The application of a coating of adhesive in an embosser-laminator can use essentially the same offset gravure process as a coater. U.S. Pat. No. 3,556,907 discloses an embossing-laminating device which is in many ways still representative of the current state of the art. U.S. Pat. No. 7,584,698 discloses an embossing-laminating device representative of the current state of the art, with an improvement over U.S. Pat. No. 3,556,907 being the open adhesive fountain and transfer rolls are replaced by an adhesive distributing assembly comprising an adhesive chamber (also known as a doctor chamber), a gravure roll (also known as an anilox roll), and an applicator roll (also known as a cliché roll).

Calibration of the process rolls in coating machines comprises setting the nip between the gravure and applicator rolls, and setting the gap between pairs of applicator rolls (in two-sided coating) or setting the gap between the applicator roll and a backing roll (in one-sided coating). Calibration of the gravure and applicator rolls in an embosser-laminator follows a similar process, except that a gap is set between the applicator roll and the embossing protuberances of an engraved embossing roll. Calibration of an embosser-laminator further comprises setting the nip(s) in one or more embossing nip stations each comprising a steel engraved roll and a pressure roll covered with an elastic material such as rubber. Calibrating the nip between a gravure roll and an applicator roll comprises (a) determining a reference point of the extent of the gap or nip engagement between the rolls, for example initial contact between the rolls (or "zero"), and (b) assuring that the extent of gap or nip engagement between the rolls is consistent across the width of the rolls. Calibrating the nip between the steel engraved roll and a pressure roll involves a similar process, but is complicated by the fact that the steel roll is engraved with a discontinuous pattern of embossing protuberances, and by the fact that the cover of the pressure roll is typically provided with a crowned profile. Calibrating the nip between a steel engraved roll and a pressure roll further comprises determining the width of the nip flat formed between the rolls, and correlating the width of the nip flat with a machine setting, for example, the positions of the actuators that move the pressure roll against the steel engraved roll. In the current state of the art, measuring a gap between rolls involves a person inserting a feeler gauge into the nip and making adjustments until the person subjectively judges that the feeler gauge fits, but only just fits, between the rolls, to a degree that is consistent across the width of the rolls. In the current state of the art, measuring a nip flat in an embossing station involves a person attaching nip impression paper (available from, for example, Valmet) to one of the rolls, loading the pressure roll against the steel engraved roll, unloading the rolls, removing the nip impression paper, drawing a line along each edge of the impression made on the nip impression paper based on their judgment of where the edges are, and measuring the distance between the lines.

Prior art methods and apparatus for calibrating process rolls are described in the patent literature. In U.S. Pat. No. 5,415,720, a stop is adjusted based on feedback from a distance sensor measuring the gap between an applicator roll and a fluted roll to set the gap to a setpoint. In U.S. Pat. No. 5,785,802, contact between a web and a roll is indicated by a change of speed of a roll. In U.S. Pat. No. 5,876,530, vibration, noise, drive torque, or reaction force indicates contact between rolls with paper disposed between the rolls. In U.S. Pat. No. 6,692,602, contact force between the rolls' bearing housings is measured, and the distance between the bearings is reduced until a decrease in the contact force between the bearing housings indicates that stop rings at the ends of the rolls have come into contact, which sets a known gap between the rolls. In U.S. Pat. No. 6,620,455, the force of the web in the nip is measured, and adjustments are made until the force reaches a setpoint. In European patent application EP1362690A1, contact between a web and a roll is indicated by a change of speed of a roll.

As will become evident from the discussion that follows, the methods and apparatus described herein provide for improved safety, precision, and repeatability in calibrating the distance and alignment between process rolls, without additional complexity or cost.

DESCRIPTION OF THE DRAWINGS

FIG. 7B is a legend for FIG. 7A;

FIG. 22B is a legend for FIG. 22A.

DETAILED DESCRIPTION

Figure 1:
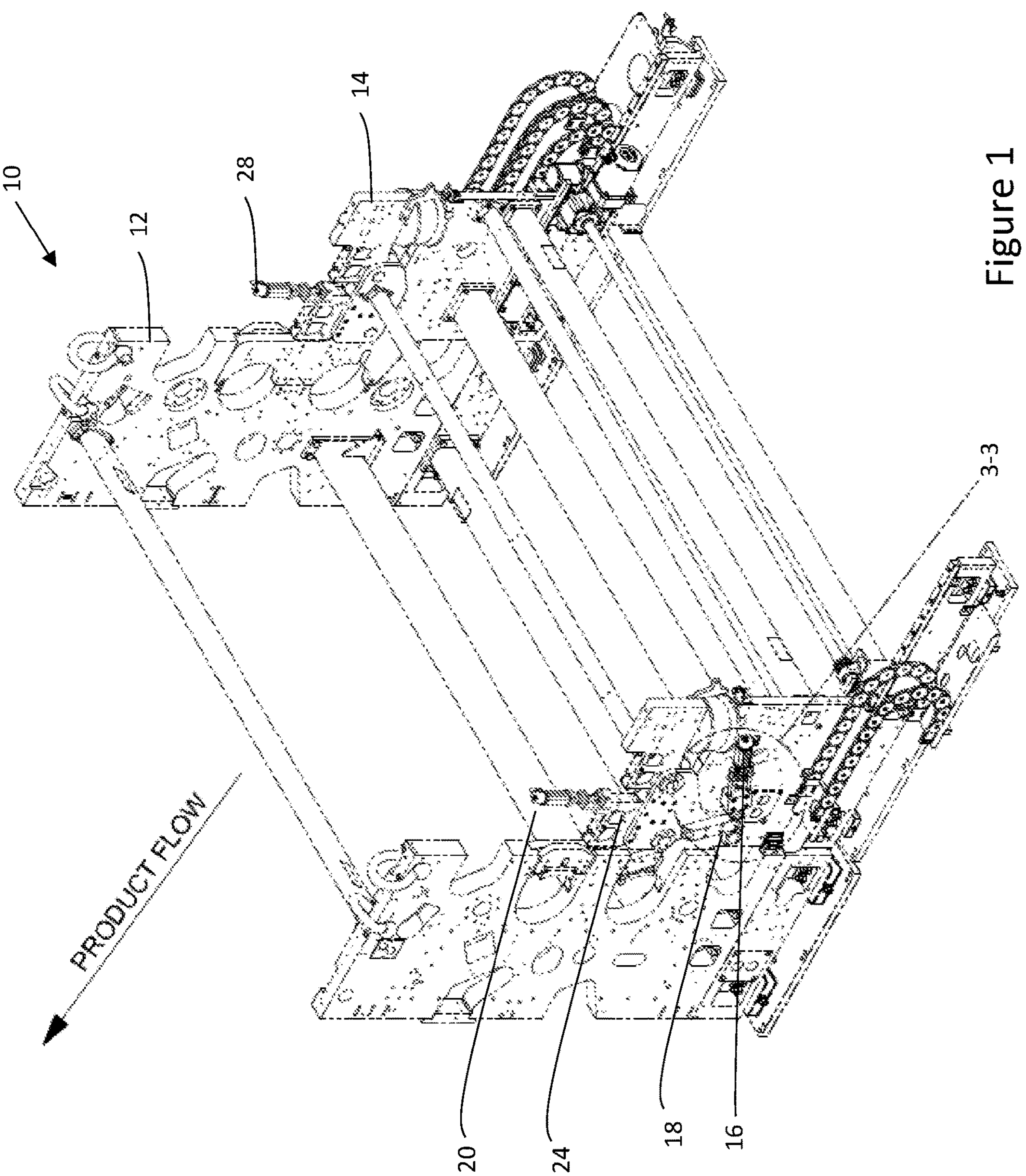
FIG. 1 is a left side, top perspective view of a mainframe structure for a laminating and embossing unit with an adhesive deck adapted and configured to be moved into and out of connection with the mainframe structure to allow installation and removal of one or more rolls associated with the laminating and embossing unit.
Figure 2:
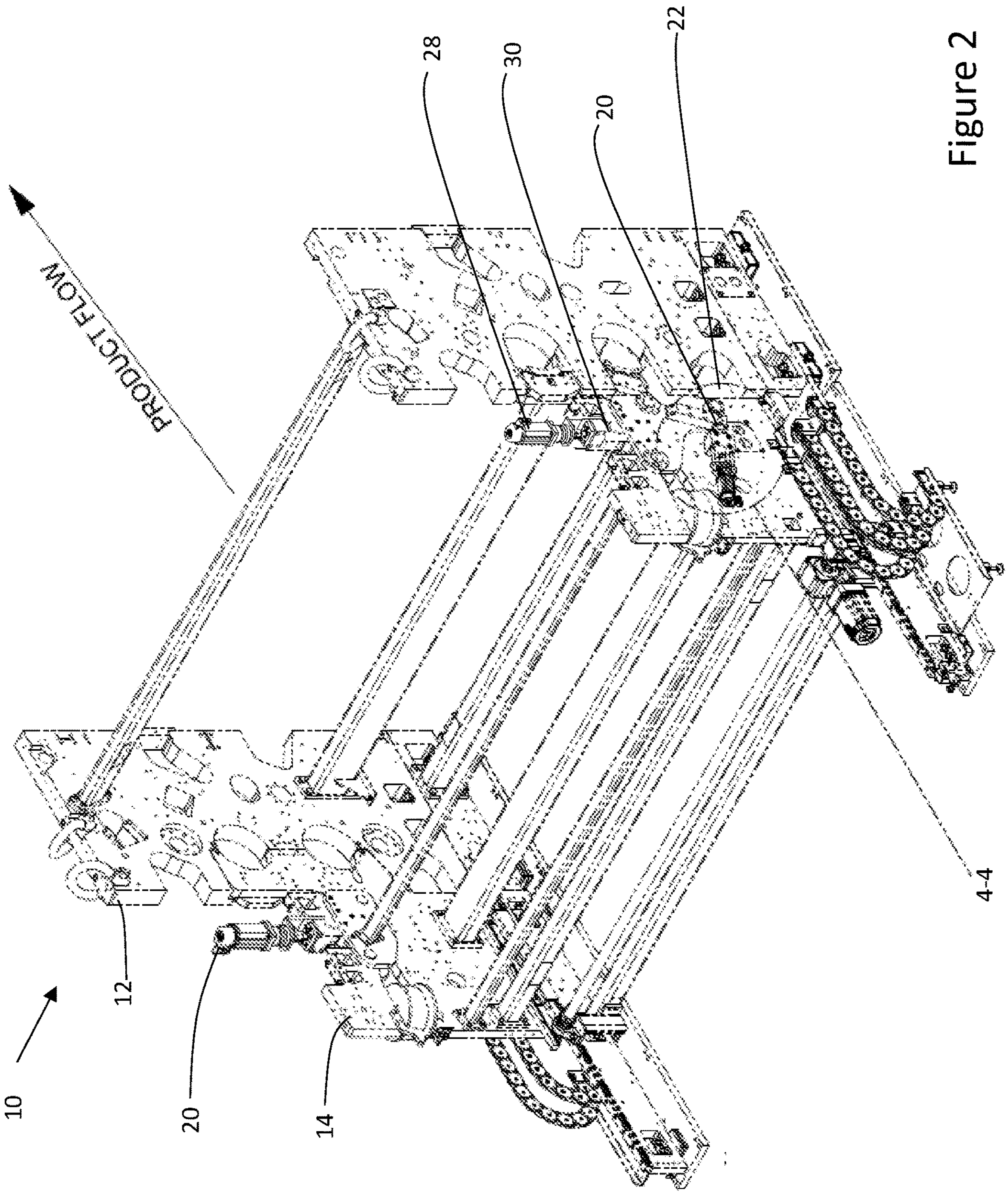
FIG. 2 is right side, top perspective of the mainframe structure of FIG. 1.
Figure 3:
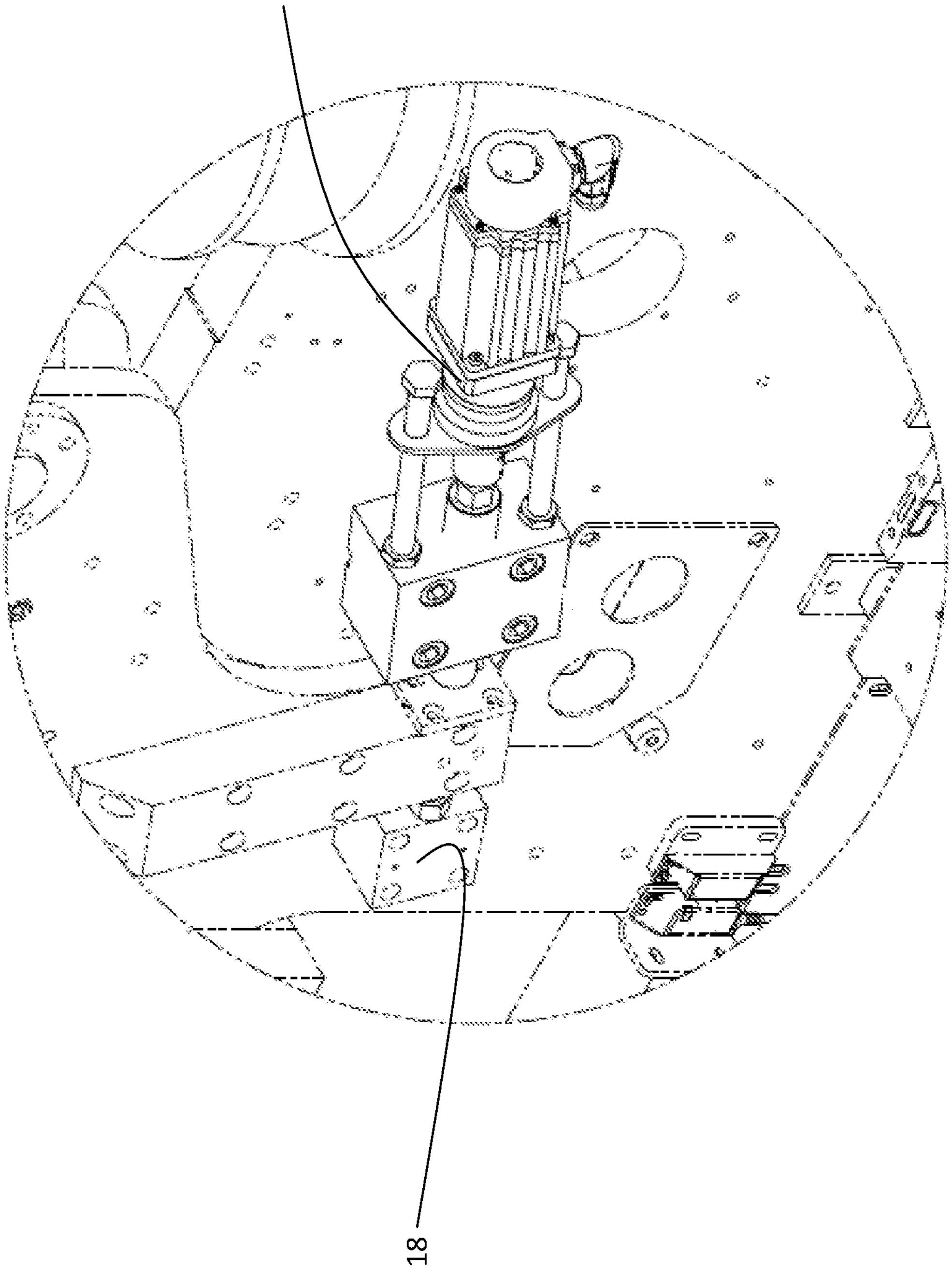
FIG. 3 is a partial, enlarged, left side perspective view of a left side actuator and stop for effectuating movement of a left side of an applicator roll of the adhesive deck relative to a left side of a steel embossing roll of the laminating and embossing unit taken from detail area 3-3 of FIG. 1.
Figure 4:
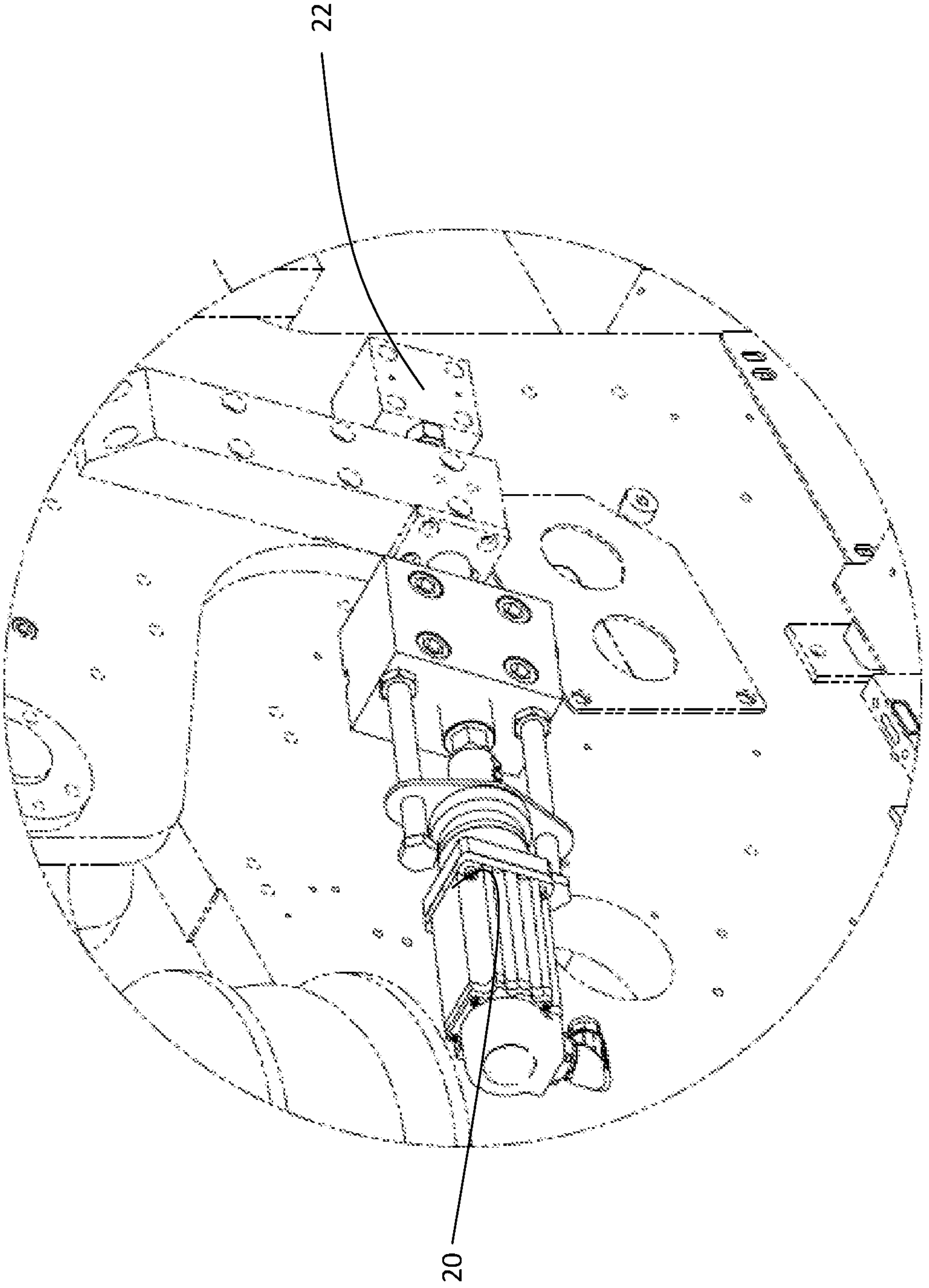
FIG. 4 is a partial, enlarged, right side, perspective view of a right side actuator and stop for effectuating movement of a right side of an applicator roll of the adhesive deck relative to a right side of a steel embossing roll of the laminating and embossing unit taken from detail area 4-4 of FIG. 2.
Figure 5:
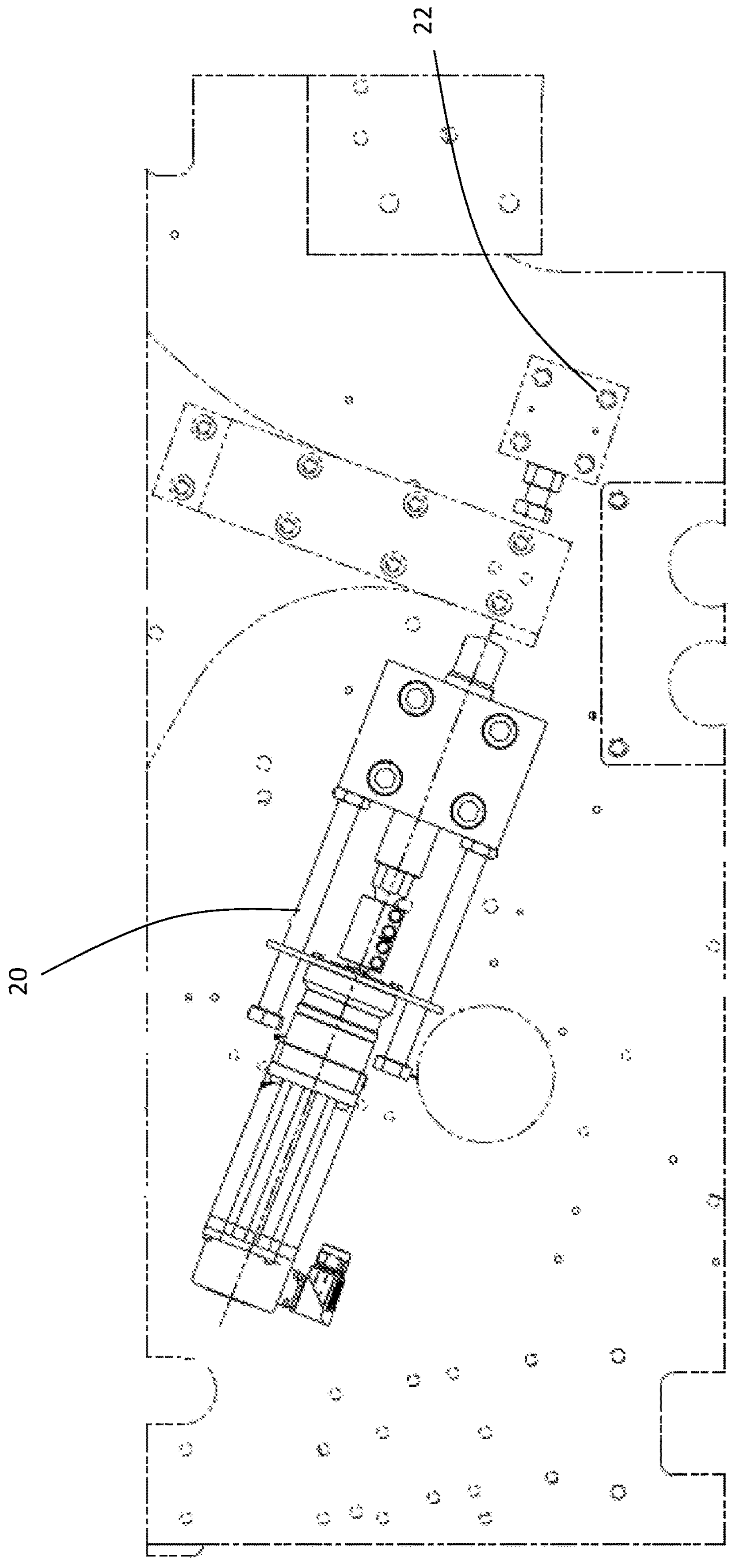
FIG. 5 is an elevation view of the right side actuator and stop of FIG. 4, the left side actuator of FIG. 3 being a mirror image thereof.
Figure 6:
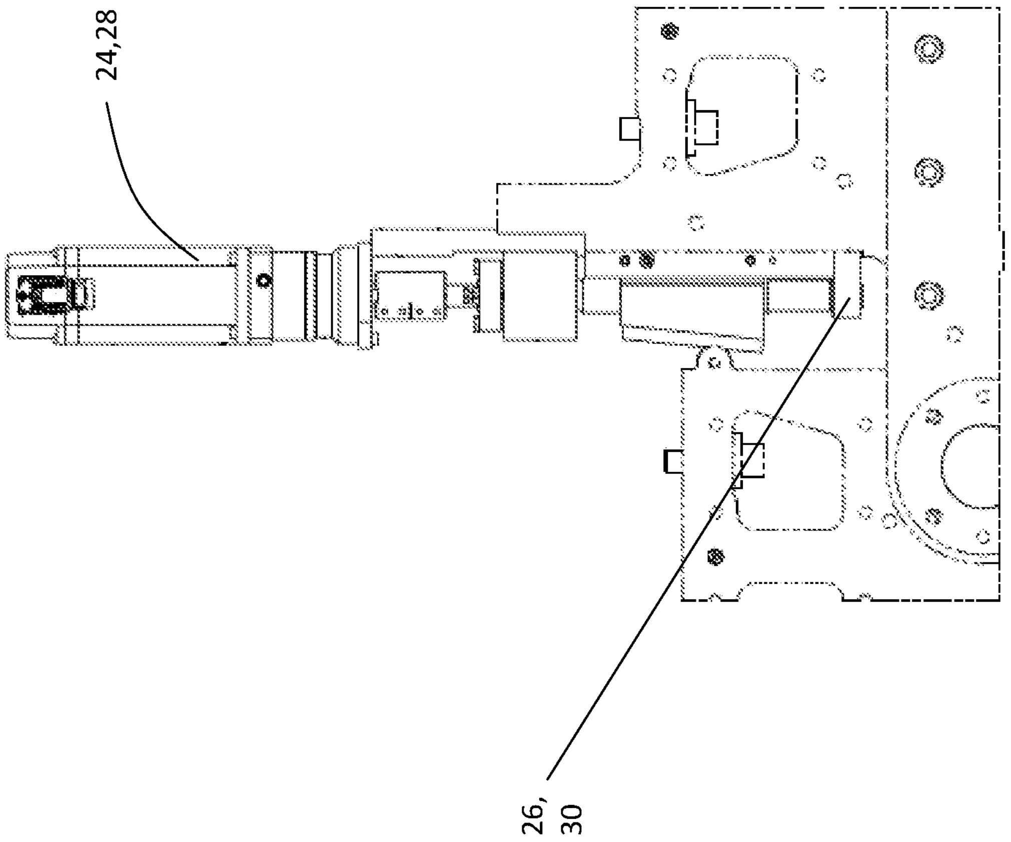
FIG. 6 is a left side, perspective view of a left side actuator and stop for effectuating movement of a left side of an applicator roll of the adhesive deck relative to a left side of a gravure roll of the adhesive deck; a right side actuator and stop being a mirror image thereof.
Figure 7A:
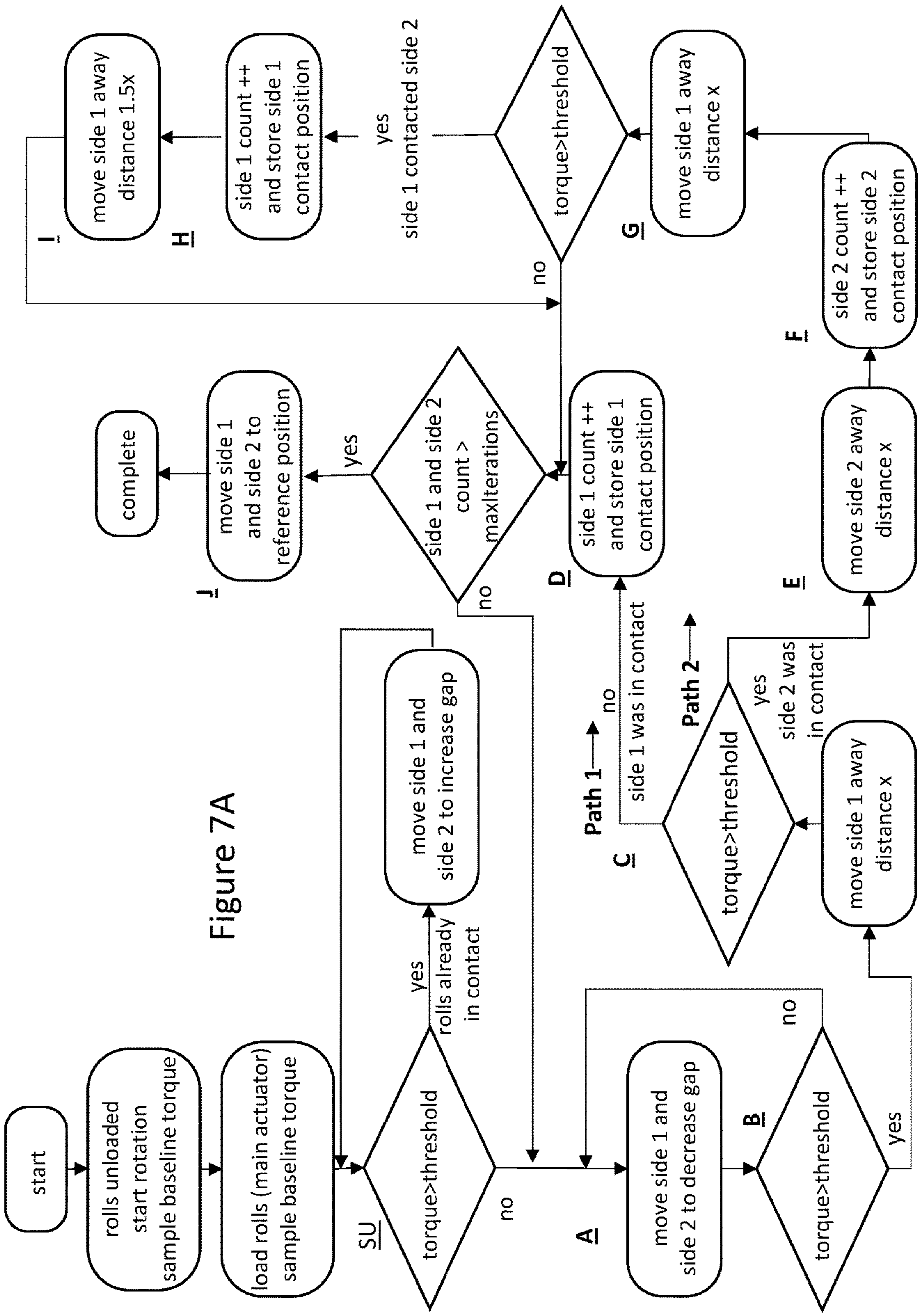
FIG. 7A is a process flow for a roll calibration process using an electronic means of indicating mutual contact between rolls.

FIGS. 1-6 show a mainframe structure 10 of a machine with a portion 12 that houses an embossing laminating unit and a portion with a subframe 14 that houses an adhesive deck. FIGS. 7A-7B show a process flow for calibrating the rolls, and FIG. 8-21 show an example of rolls being calibrated using the process of FIGS. 7A-7B, for example, a gravure roll and an applicator roll in a coater or an embosser-laminator.

In general, the process described herein involves an iterative process of moving axial ends of one of the rolls being calibrated a set incremental distance until contact between the rolls is made and then making a correction to the distance based upon the end of the roll making contact. During the calibration process described below, one or both of the rolls being calibrated may be driven in rotation with a motor. In the case of calibrating an applicator roll and gravure roll, both rolls may be driven. Given characteristics of the system, for example inertia, static friction, and surface finish, rotating both rolls during the calibration process may be advantageous to improve resolution in detecting roll contact and/or to avoid damaging the rolls. Feedback regarding motor torque, roll position, or speed may be used to indicate a change of state between roll faces, that is whether the rolls are in contact or not in contact. The rolls being calibrated require a level of precision in distance and alignment such that a determination of the mere fact that the rolls are in mutual contact is insufficient. As such, the process requires a determination of which end of the rolls makes contact first as the rolls are loaded together.

The processes described herein may be used to calibrate an applicator roll and a steel engraved roll in an embosser laminator. Since both rolls are driven, and the applicator roll is typically durable, there is low risk that the steel engraved roll will damage the applicator roll during the process. The processes described herein may also be used to calibrate a marrying roll and a steel engraved roll in an embosser laminator. Even though the marrying roll is sometimes not driven, it is typically very durable, and there is low risk that the steel engraved roll will damage the marrying roll during the process.

In calibrating the rolls, opposite ends of the one of the respective rolls (side 1 and side 2 in the drawings 8-21) may be moved using an actuator. Side 1 and side 2 refer to ends of the rolls, such as the operator side and the drive side. As shown in the drawings (in particular, FIGS. 3-5), a left side actuator 16 and a stop 18, and a right side actuator 20 and a stop 22 may be provided on respective sides of the mainframe structure 10 adjacent the bearings and may be configured to adjust the distance between the applicator roll and the steel embossing roll. For instance, opposite axial ends of the applicator roll may be adjusted relative to the mainframe/subframe. Also, as shown in the drawings (in particular, FIG. 6), a left side actuator 24 and a stop 26, and a right side actuator 28 and a stop 30 may be provided to adjust the distance between the applicator roll and the gravure roll. For instance, opposite axial ends of the gravure roll may be adjusted relative to the mainframe/subframe. The actuators may include pneumatic actuators, such as a Firestone model W01-358-6952, or an electric motor driven actuator with a ball or acme leadscrew. The distance between the rolls may be delimited by stops provided with feedback regarding the positions of the stops. The distance between the rolls may be changed by changing the position of a stop wedge, or by operating a threaded member to change the position of the stop, at the end of the rolls.

The rolls may be loaded to increase or decrease the distance between the roll axes of rotation by actuating the actuators. The incremental distance 'x' by which the distance between the rolls is changed may correspond to a defined gap that can be used for physical verification, for example 0.25 mm or 0.13 mm (a 0.010" gage feeler stock or a 0.005" gage feeler stock). The set incremental distance may also be set based upon the geometry of the faces of the rolls, the resolution of the actuators and position indicators, roll surface finishes, and cylindrical runout. As shown in FIGS. 8-21, once the ends of the rolls (sides 1 and 2) on both sides of the machine have made contact once, contact typically alternates between the sides until a number of instances of each side making contact is reached. Each side making contact a predetermined number of times, for example three times (a threshold number of instances of contact or "maxIterations" in FIGS. 7 and 22) may be a sufficient number of instances of contact for the precision required in coating or lamination. When the process indicates that both sides make contact simultaneously, one side can be moved by the incremental distance multiplied by a factor, for example 1.5, in order to continue through the calibration process.

In one aspect, the method involves, step (i) of positioning the rolls in a state which the faces of the rolls are not in mutual contact; and step (ii) of rotating at least one of the rolls and sampling baseline motor torque or speed. Contact between the faces of the roll may be indicated by one or more of: motor torque, roll angular position error, or change in roll speed. In the description herein, torque is used. If sampled motor torque exceeds an established threshold for motor torque corresponding to free rotation of the roll (i.e., the roll not being in contact), the rolls are already in contact and must be disengaged by increasing the distance. Likewise, if change in roll speed is used as an indication of contact, if change in roll speed exceeds an established threshold for speed corresponding to free rotation of the roll (i.e., the roll not being in contact), the rolls are already in contact and must be disengaged by increasing the distance. This step is shown at SU in FIGS. 7A&B. As mentioned earlier, once the rolls are devoid of contact and an initial position is established, the settings delimiting the distance between the roll axes of rotation, for example, the positions of the stops associated with the ends of the respective rolls, may be set and recorded. This may further include enabling at least one of the actuators and stops to generate feedback signals representative of the relative position of the stops and/or actuator associated with the ends of the rolls and determining the distance between the ends of the rolls based at least in part upon the feedback signals.

Figure 8:
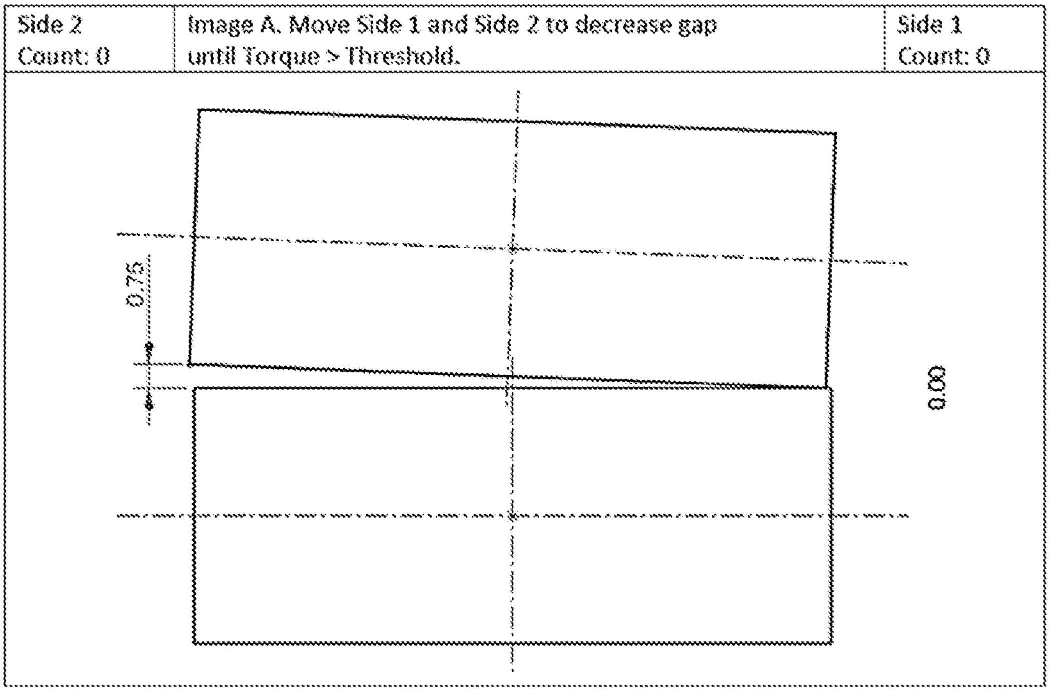
FIGS. 8-21 are an example of rolls being calibrated using the process of FIG. 7A.

Once it is established that the sampled motor torque is below the threshold level, the calibration method may proceed (for instance, to A in FIG. 7A) to step (iii) of decreasing the distances between the first ends and the second ends of the rolls until contact between the faces of the rolls is indicated by sampled motor torque being above the threshold level. By way of example, the status of the rolls after completing steps (i)-(iii) is shown in FIG. 8. This step is shown at B in FIG. 7A.

Figure 9:
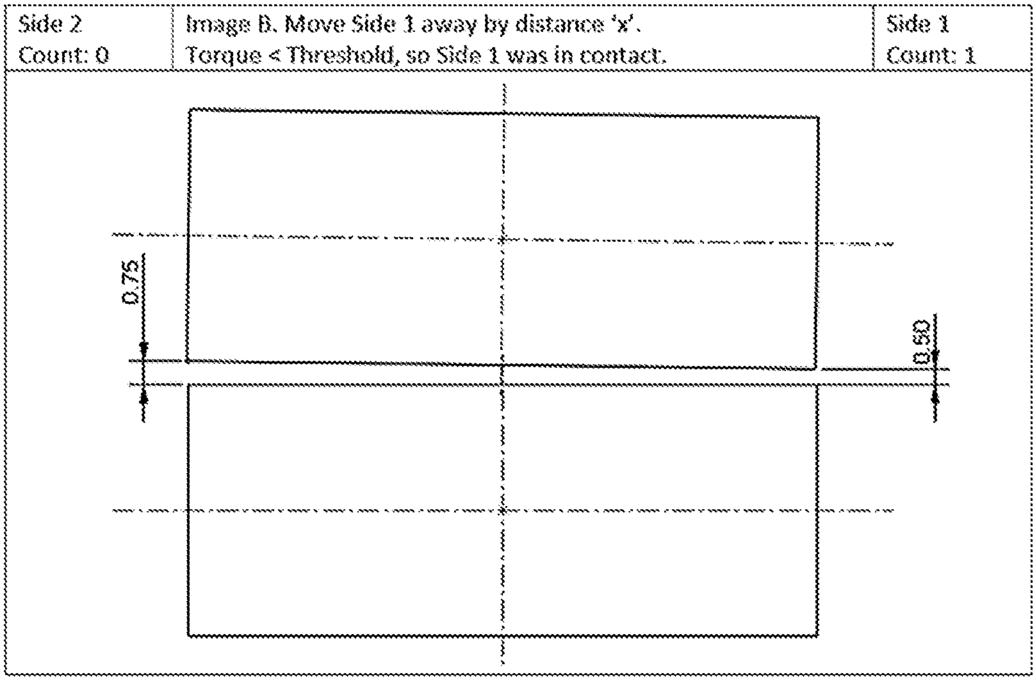

In a further aspect of the method, step (iv) may be performed to increase the distance between the first ends of the rolls by a set incremental amount. For instance, as shown in FIG. 9, side 1 of the roll is moved away from side 1 of the other roll by 0.50 mm while side 2 is fixed. Because the rolls continue to rotate, a change in motor torque may be used as an indicator to determine whether the contact between the faces of the rolls maintains or is removed at step (iv). This step (iv) is shown at C in FIG. 7A. In the example, side 1 is the first side to make contact, but it should be appreciated that side 2 can be the first side to make contact given different initial conditions.

At this point, in accordance with the method, step (v) may be performed to determine which ends of the rolls made contact. If the contact is removed as indicated by torque being below the threshold level, the first ends of the rolls are in contact, and the method may then proceed on path 1 as described below. If the contact maintains as indicated by torque being above the threshold level, the second ends of the rolls are in contact, and the method may then proceed on path 2 as described below. As shown in the example of FIGS. 8 and 9, the first ends of the rolls are in contact and the example of FIGS. 8 and 9 will continue along path 1.

In accordance with path 1, the position of the actuator associated with controlling the distance between the first ends of the rolls from step (iii) may be recorded and the count of instances of contact of the first ends of the rolls may be incremented. This step is shown at D in FIGS. 7A&B. As the threshold number of instances of contact has not been reached, the process returns to point A in FIGS. 7A&B.

Figure 10:
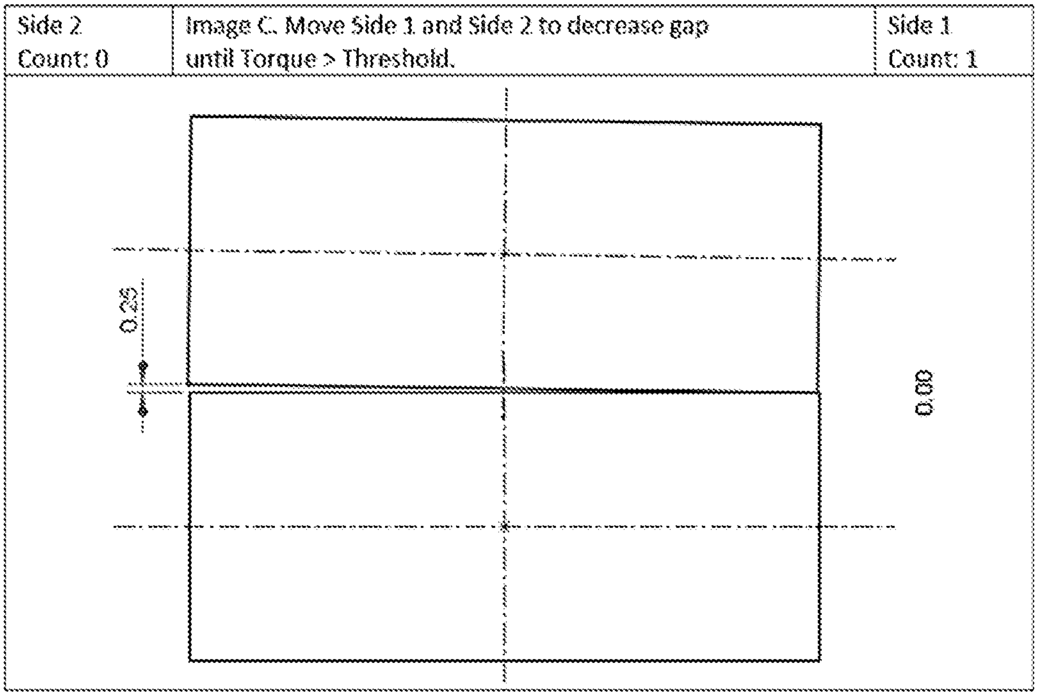

In accordance with an aspect of the method, step (vi) may be performed to decrease the distance between the first ends of the rolls and the second ends of the rolls until contact between the faces of the rolls is indicated by sampled motor torque being above the threshold level. For instance, as shown in FIG. 10, the first and second ends of the rolls are moved to decrease the distance until contact is made (as shown in the drawings 0.50 mm). This step is shown again at B in FIG. 7A.

Figure 11:
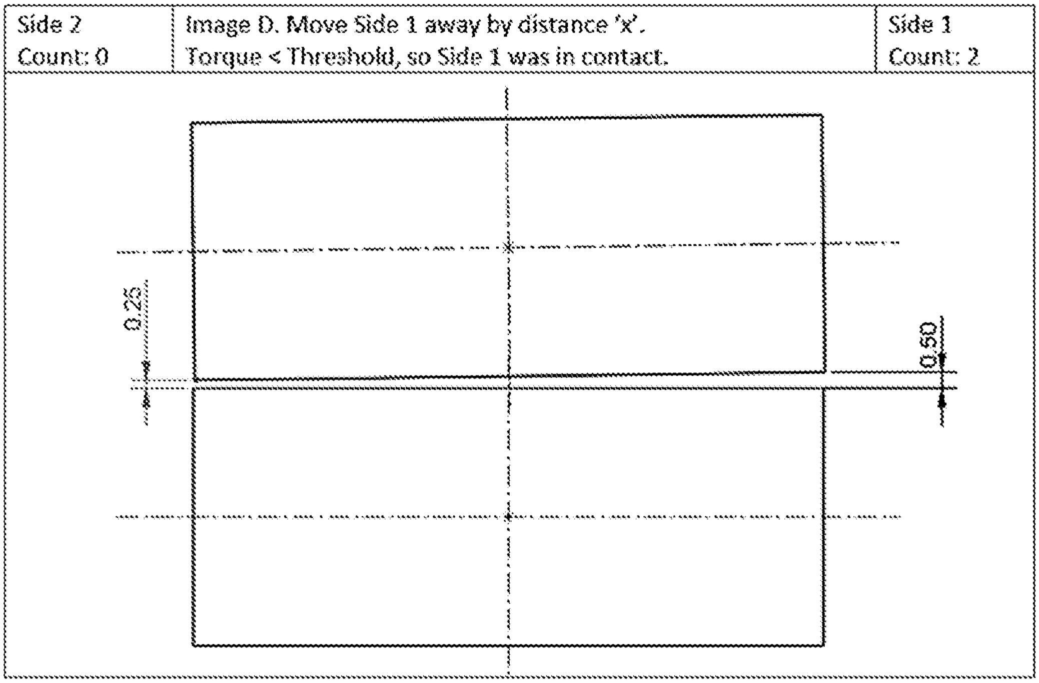

In a further aspect of the method, step (vii) may be performed to increase the distance between the first ends of the rolls by a set incremental amount while keeping the second ends of the rolls fixed. For instance, as shown in FIG. 11, side 1 of the roll is moved away from side 1 of the other roll by 0.50 mm while side 2 is fixed. Because the rolls continue to rotate, a change in motor torque may be used as an indicator to determine whether the contact between the faces of the rolls is maintained or is removed at step (vii). This step is shown at C in FIG. 7A.

At this point, in accordance with the method, step (viii) may be performed to determine which ends of the rolls made contact. If the contact is removed as indicated by torque being below the threshold level, the first ends of the rolls were in contact, and the method may then proceed on path 1. If the contact maintains as indicated by torque being above the threshold level, the second ends of the rolls are in contact, and the method may then proceed on path 2 as described below. As shown in the example of FIGS. 10 and 11, the first ends of the rolls are in contact.

In accordance with path 1, the position of the actuator associated with controlling the distance between the first ends of the rolls from step (vi) (as shown in the drawings 0.50 mm) and another instance of contact of the first ends of the rolls may be recorded. This step is shown at D in FIG. 7A. As the threshold number of instances of contact has not been reached, the process returns to point A in FIG. 7A.

Figure 12:
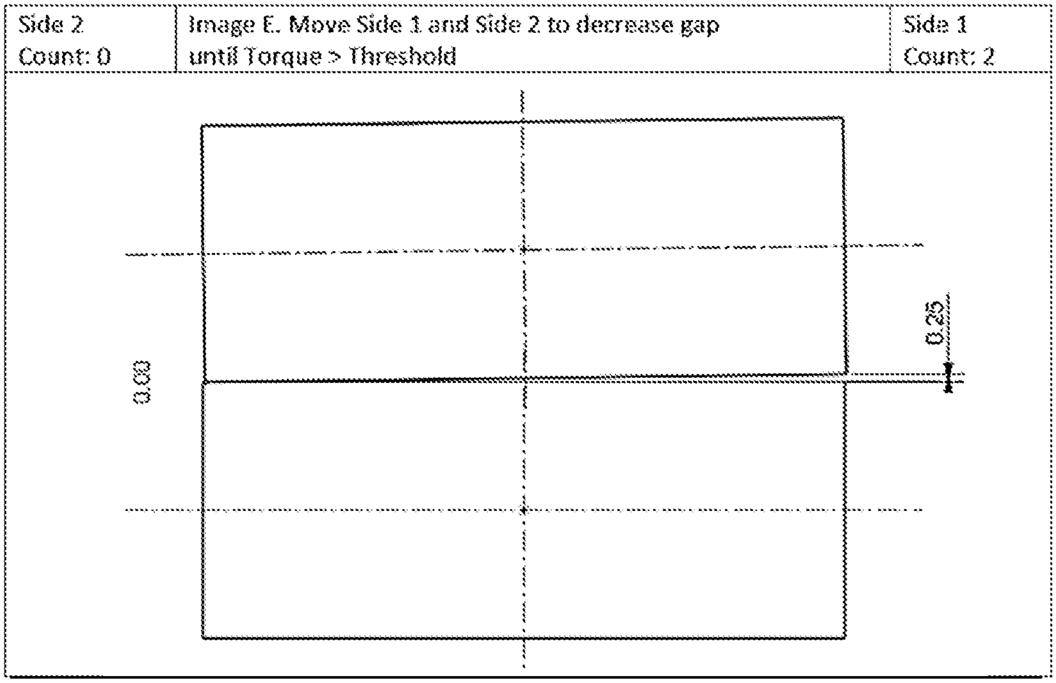

Then, in accordance with an aspect of the method, step (ix) may be performed to decrease the distance between the first ends of the rolls and the second ends of the rolls until contact between the faces of the rolls is indicated by sampled motor torque being above the threshold level. For instance, as shown in FIG. 12, the first and second ends of the rolls have moved 0.25 mm when contact is made. This step is shown again at B in FIG. 7A.

Figure 13:
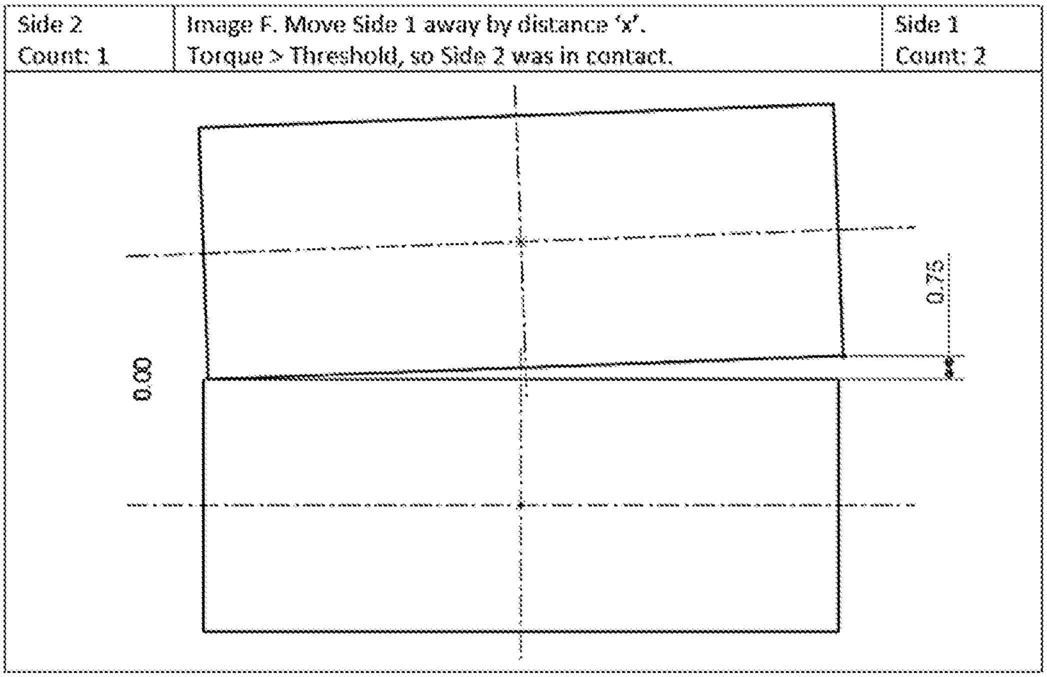

In a further aspect of the method, step (x) may be performed to increase the distance between the first ends of the rolls by a set incremental amount while keeping the second ends of the rolls fixed. For instance, as shown in FIG. 13, side 1 of the roll is moved away from side 1 of the other roll by 0.50 mm while side 2 is fixed. Because the rolls continue to rotate, a change in motor torque may be used as an indicator to determine whether the contact between the faces of the rolls maintains or is removed at step (x). This step is shown at C in FIG. 7A.

At this point, in accordance with the method, step (xi) may be performed to determine which ends of the rolls made contact. If the contact is removed as indicated by torque being below the threshold level, the first ends of the rolls are in contact, and the method may then proceed on path 1. If the contact maintains as indicated by torque being above the threshold level, the second ends of rolls are in contact, and the method may then proceed on path 2 as described below. As shown in the example of FIGS. 12 and 13, the second ends of the rolls are in contact.

Figure 14:
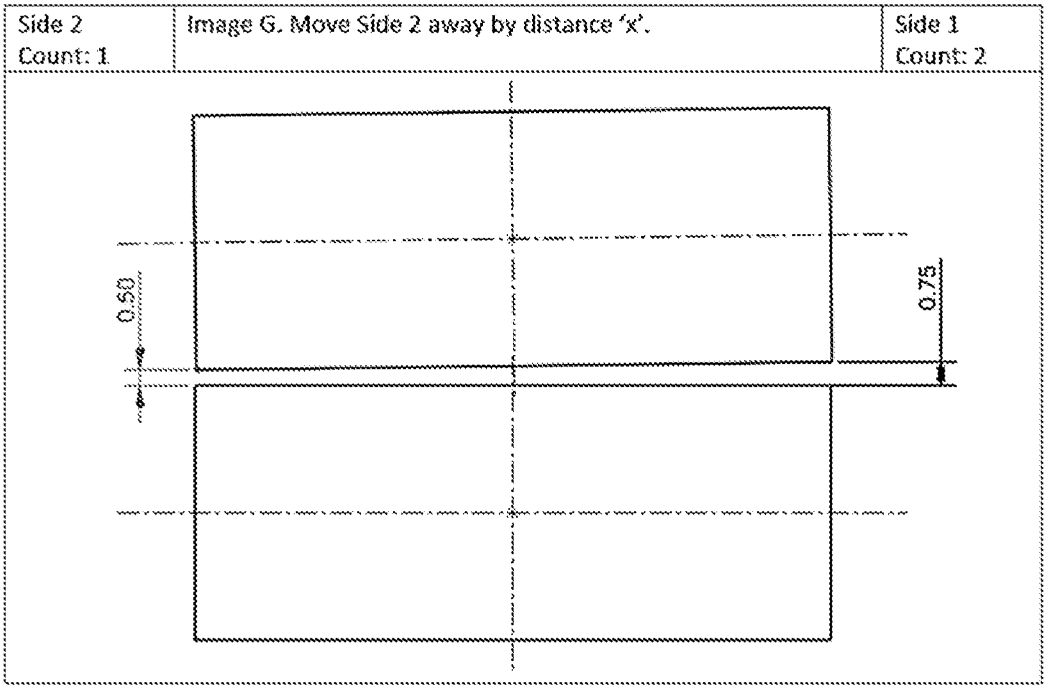
Figure 15:
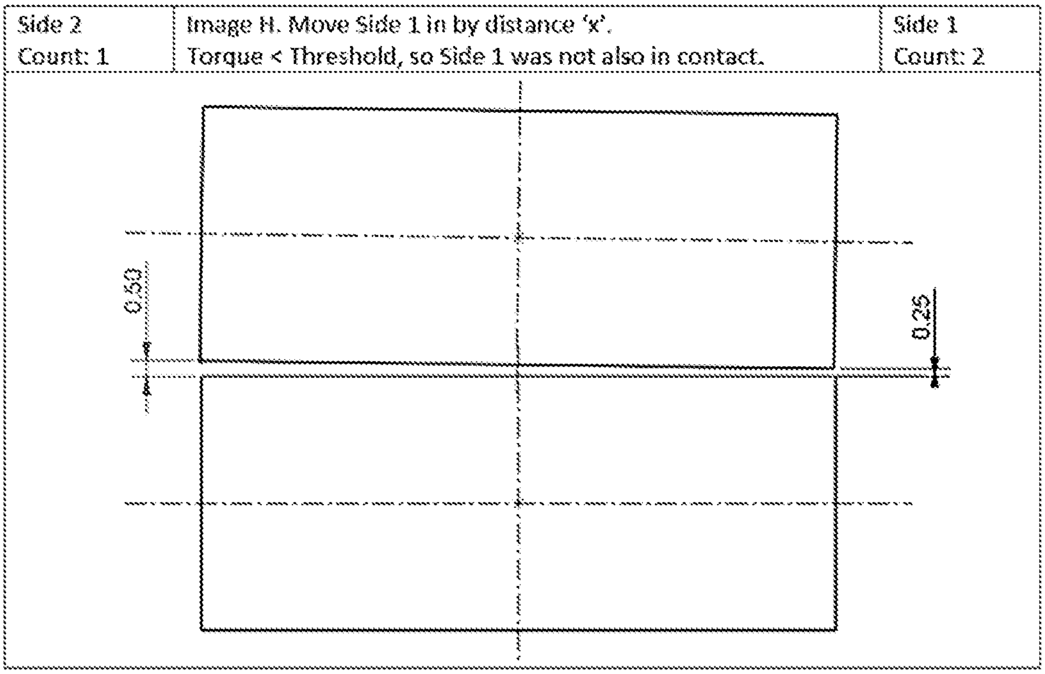

In accordance with path 2, in a further aspect of the method, step (xii) may be performed to increase the distance between second ends of the rolls by the set incremental amount while maintaining the distance between the first ends of the rolls fixed. This is shown at E in FIG. 7A. In the example of FIG. 14, the distance between the second ends of the rolls is increased by 0.50 mm. Also, in accordance with the method, step (xiii) may be performed, and the position of the actuator associated with controlling the distance between the second ends of the rolls from step (ix) may be recorded (as shown in the drawings 0.25 mm) and an instance of contact of the second ends of the rolls may be recorded. This step is shown at F in FIG. 7A.

Then, in accordance with an aspect of the method, step (xiv) may be performed to decrease the distance between the first ends of the rolls by the set incremental amount while the second ends of the rolls is fixed. This step is shown again at G in FIG. 7A and FIG. 15.

At this point, in accordance with the method, step (xv) may be performed to determine whether the first ends of the rolls also made contact during the performing of step (ix) (that is, the distance between the first ends of the rolls and the second ends of the rolls is decreased until there is contact between the faces of the rolls). If there is no contact after performing step (xiv) (that is, decreasing the distance between first ends of the rolls while the seconds ends are fixed) and the threshold amount of allowed instances of contact for the first and second ends has not been reached, then in accordance with the method, the process may return to point A of FIG. 7A, and the distance between the first and second ends of the rolls may be decreased until contact is made as indicated by torque above the threshold level, which is shown at B in FIG. 7A. If there is contact after performing step (xiv), which indicates that the first ends of the roll were also in contact when the second ends of the roll were in contact, the position of the actuator associated with controlling the distance between the first ends of the rolls from step (ix) and another instance of contact of the first ends of the rolls may be recorded. This step is shown at H in FIG. 7A. Further, the distance between the first ends of the rolls may be increased by a factor applied to the set incremental distance, for instance, 1.5 times the set incremental distance. This step is shown at I in FIG. 7A. If the threshold number of instances of contact has not been reached, the process returns to point A in FIG. 7A.

Figure 16:
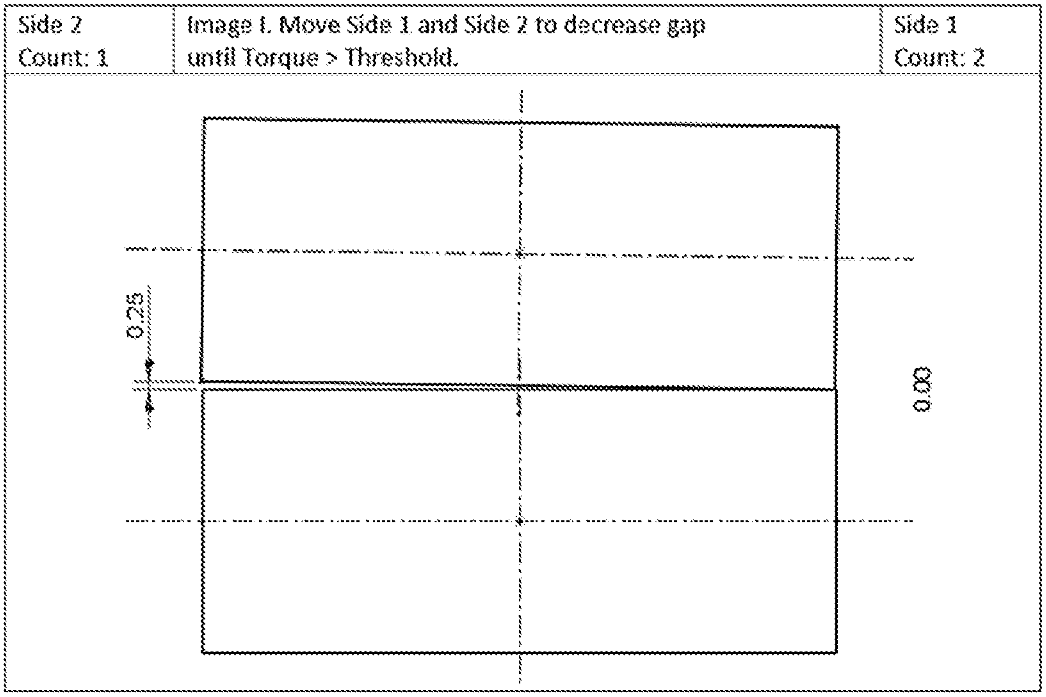

Making reference to the example shown FIG. 16, where steps (xiv) and (xv) indicate that the first ends of the roll were not in contact and the threshold number of instances of contact has not been reached, the process returns to point A in FIG. 7A. In accordance with an aspect of the method, step (xvi) may be performed and the distance between the first ends of the rolls and the second ends of the rolls may be decreased until contact between the faces of the rolls is indicated by sampled motor torque being above the threshold level. For instance, as shown in FIG. 16, the first and second ends of the rolls have moved 0.25 mm when contact is made. This step is shown again at B in FIG. 7A.

Figure 17:
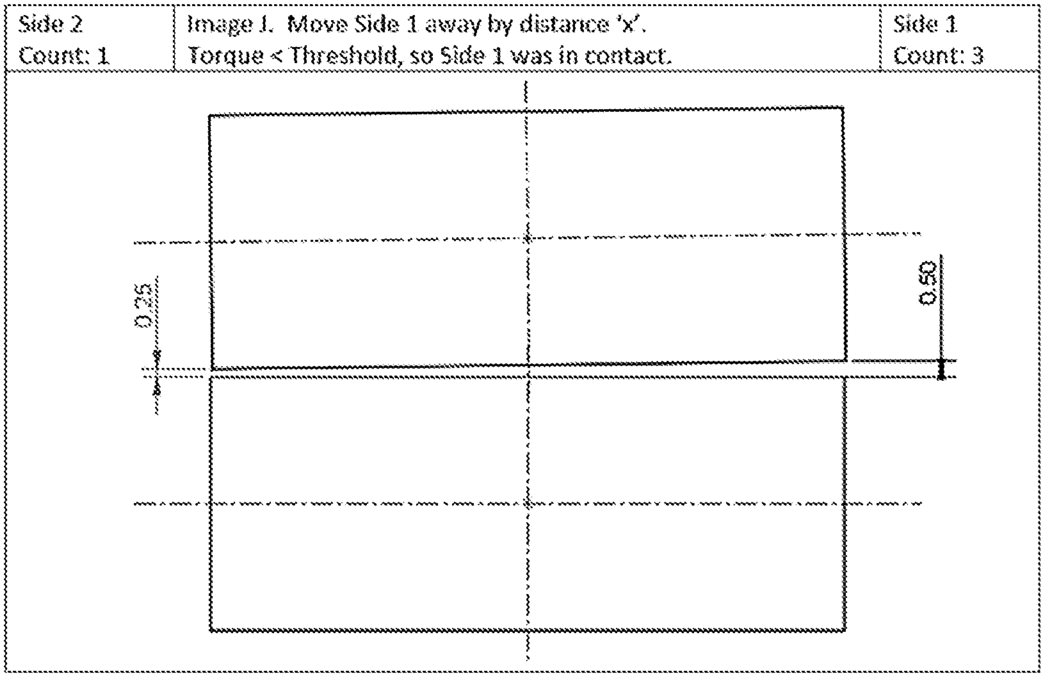

In a further aspect of the method, step (xvii) may be performed and the distance between the first ends of the rolls may be increased by a set incremental amount while keeping the second ends of the rolls fixed. For instance, as shown in FIG. 17, side 1 of the roll is moved away from side 1 of the other roll by 0.50 mm while side 2 is fixed. Because the rolls continue to rotate, a change in motor torque may be used as an indicator to determine whether the contact between the faces of the rolls maintains or is removed at step (xvii). This step is shown at C in FIG. 7A.

At this point, in accordance with the method, step (xviii) may be performed to determine which ends of the rolls made contact. If the contact is removed as indicated by torque being below the threshold level, side 1 of the rolls are in contact, and the method may then proceed on path 1. If the contact maintains as indicated by torque being above the threshold level, side 2 of rolls are in contact, and the method may then proceed on path 2 as described below. As shown in the example of FIGS. 16 and 17, the first ends of the rolls are in contact.

In accordance with path 1, the position of the actuator associated with controlling the distance between the first ends of the rolls from step (xvi) may be recorded (as shown in the drawings 0.25 mm) and another instance of contact of the first ends of the rolls may be recorded. This step is shown at D in FIG. 7A. Provided the threshold number of allowed instances of contact of the first and second ends has not been reached, the process may continue as described above.

Figure 18:
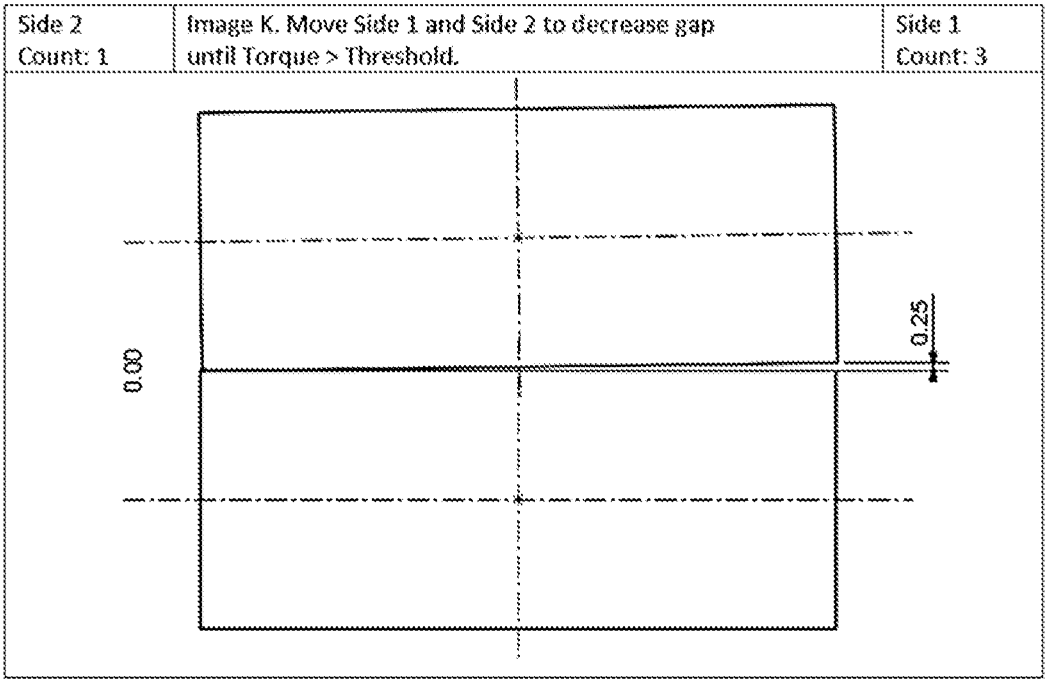

Continuing from the example shown in FIGS. 16 and 17, in accordance with an aspect of the method, step (xix) may be performed and the distance between the first ends of the rolls and the second ends of the rolls may decreased until contact between the faces of the rolls is indicated by sampled motor torque being above the threshold level. For instance, as shown in FIG. 18, the first and second ends of the rolls have moved 0.25 mm when contact is made. This step is shown again at B in FIG. 7A.

Figure 19:
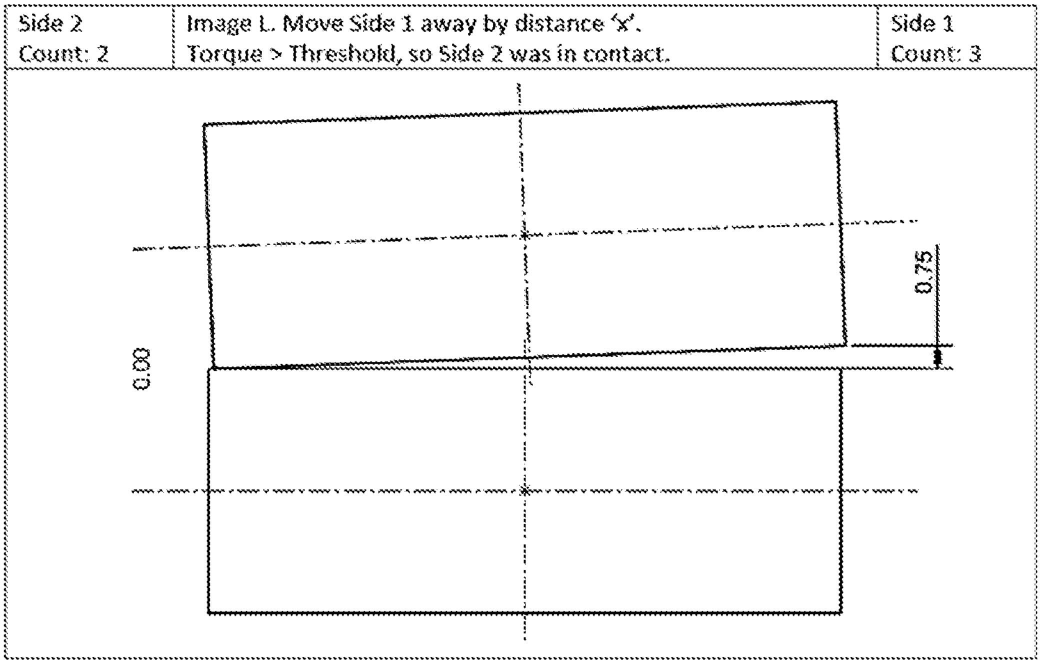

In a further aspect of the method, step (xx) may be performed and the distance between the first ends of the rolls may be increased by a set incremental amount while keeping the second ends of the rolls fixed. For instance, as shown in FIG. 19, side 1 of the roll is moved away from side 1 of the other roll by 0.50 mm while side 2 is fixed. Because the rolls continue to rotate, a change in motor torque may be used as an indicator to determine whether the contact between the faces of the rolls maintains or is removed at step (xx). This step is shown at C in FIG. 7A.

At this point, in accordance with the method, step (xxi) may be performed to determine which ends of the rolls made contact. If the contact is removed as indicated by torque being below the threshold level, side 1 of the rolls are in contact, and the method may then proceed on path 1. If the contact maintains as indicated by torque being above the threshold level, side 2 of rolls are in contact, and the method may then proceed on path 2 as described below. As shown in the example of FIGS. 18 and 19, the second ends of the rolls are in contact.

Figure 20:
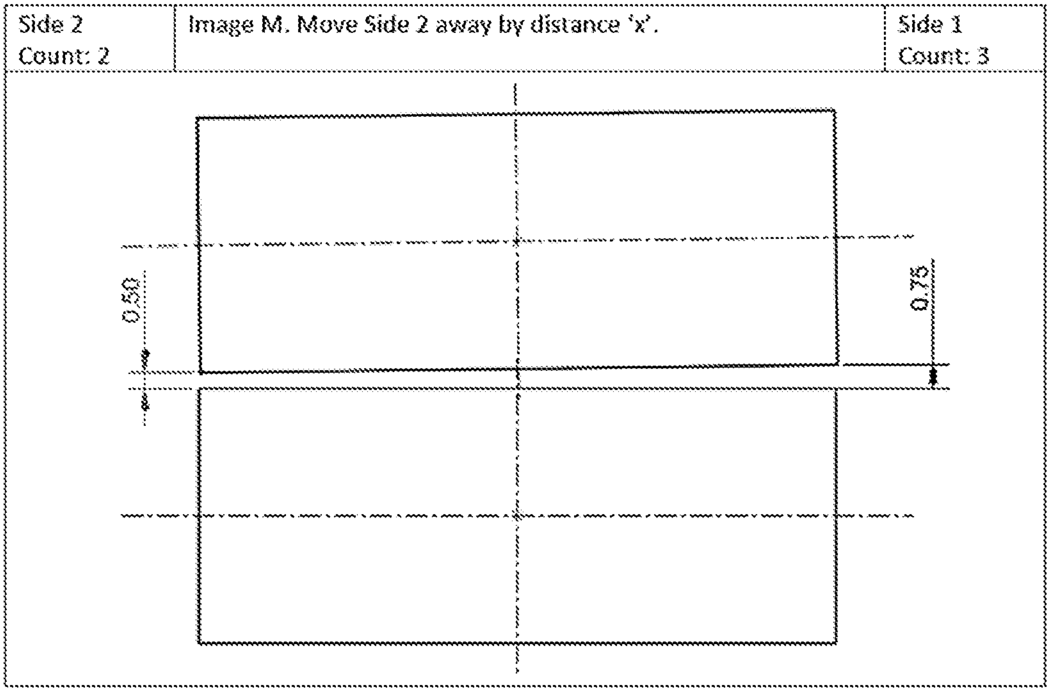
Figure 21:
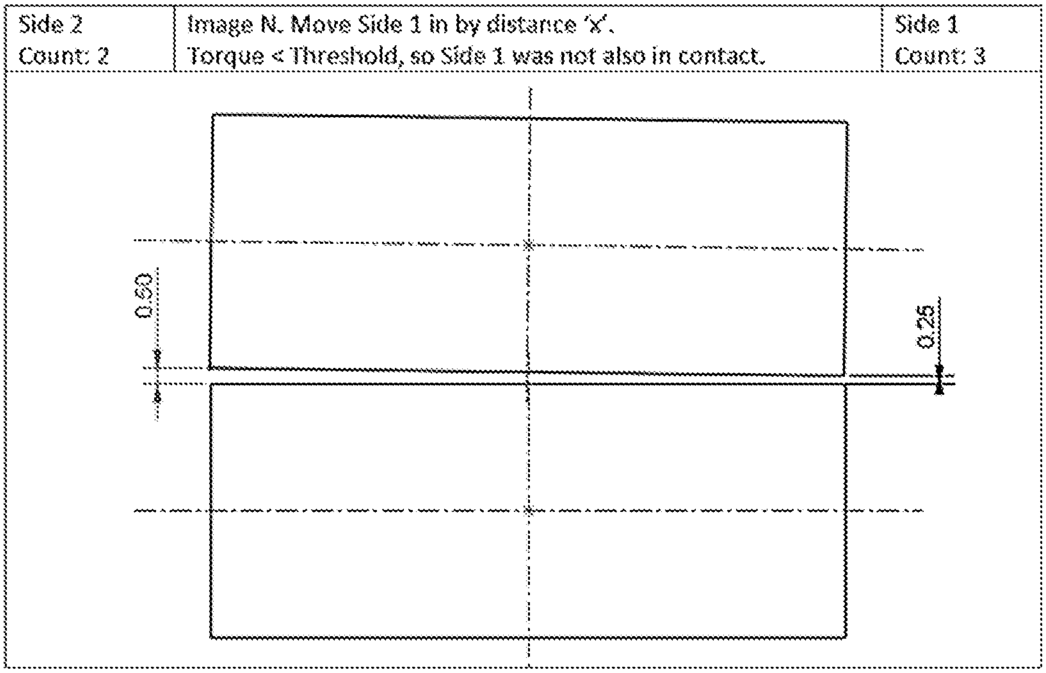

In accordance with path 2, in a further aspect of the method, step (xxii) may be performed and the distance between seconds ends of the rolls may be increased by the set incremental amount while maintaining the distance between the first ends of the rolls fixed. This is shown at E in FIG. 7A. In the example of FIG. 20, the distance between the second ends of the rolls is increased by 0.50 mm. Also, in accordance with the method, step (xxiii) may be performed and the position of the actuator associated with controlling the distance between the second ends of the rolls from step (xix) may be recorded (as shown in the drawings 0.25 mm) and an instance of contact of the second ends of the rolls may be recorded. This step is shown at F in FIG. 7A.

Then, in accordance with an aspect of the method, step (xxiv) may be performed and the distance between the first ends of the rolls may be decreased by the set incremental amount while the second ends of the rolls is fixed. This step is shown again at G in FIG. 7A and FIG. 21.

At this point, in accordance with the method, step (xxv) may be performed to determine whether the first ends of the rolls also made contact during the performing of step (xix) (that is, the distance between the first ends of the rolls and the second ends of the rolls is decreased until contact between the faces of the rolls). If there is no contact after performing step (xxiv) (that, is decreasing the distance between first ends of the rolls while the seconds ends are fixed) and the threshold amount of allowed instances of contact for the first and second ends has not been reached, then in accordance with the method, the process may return to point A of FIG. 7A, and the distance between the first and second ends of the rolls may be decreased until contact is made as indicated by torque above the threshold level, which is shown at B in FIG. 7A. If there is contact after performing step (xxiv), which indicates that the first ends of the roll were also in contact when the second ends of the roll were in contact, the position of the actuator associated with controlling the distance between the first ends of the rolls from step (xix) and another instance of contact of the first ends of the rolls may be recorded. This step is shown at H in FIG. 7A. Further, the distance between the first ends of the rolls may be increased by a factor applied to the set incremental distance, for instance, 1.5 times the set incremental distance. This step is shown at I in FIG. 7A.

In keeping with the example shown in FIGS. 8-21, the process will continue until the threshold number of instances of contact are made. In particular, the process shown in FIG. 16-21 will continue with first ends of the rolls making contact and second ends of the rolls making contact. Once the threshold number of instances of contact are made, the first and second ends may be brought to reference positions and the normal operation of the machine may begin. This is indicated at J in FIG. 7A.

Figure 22A:
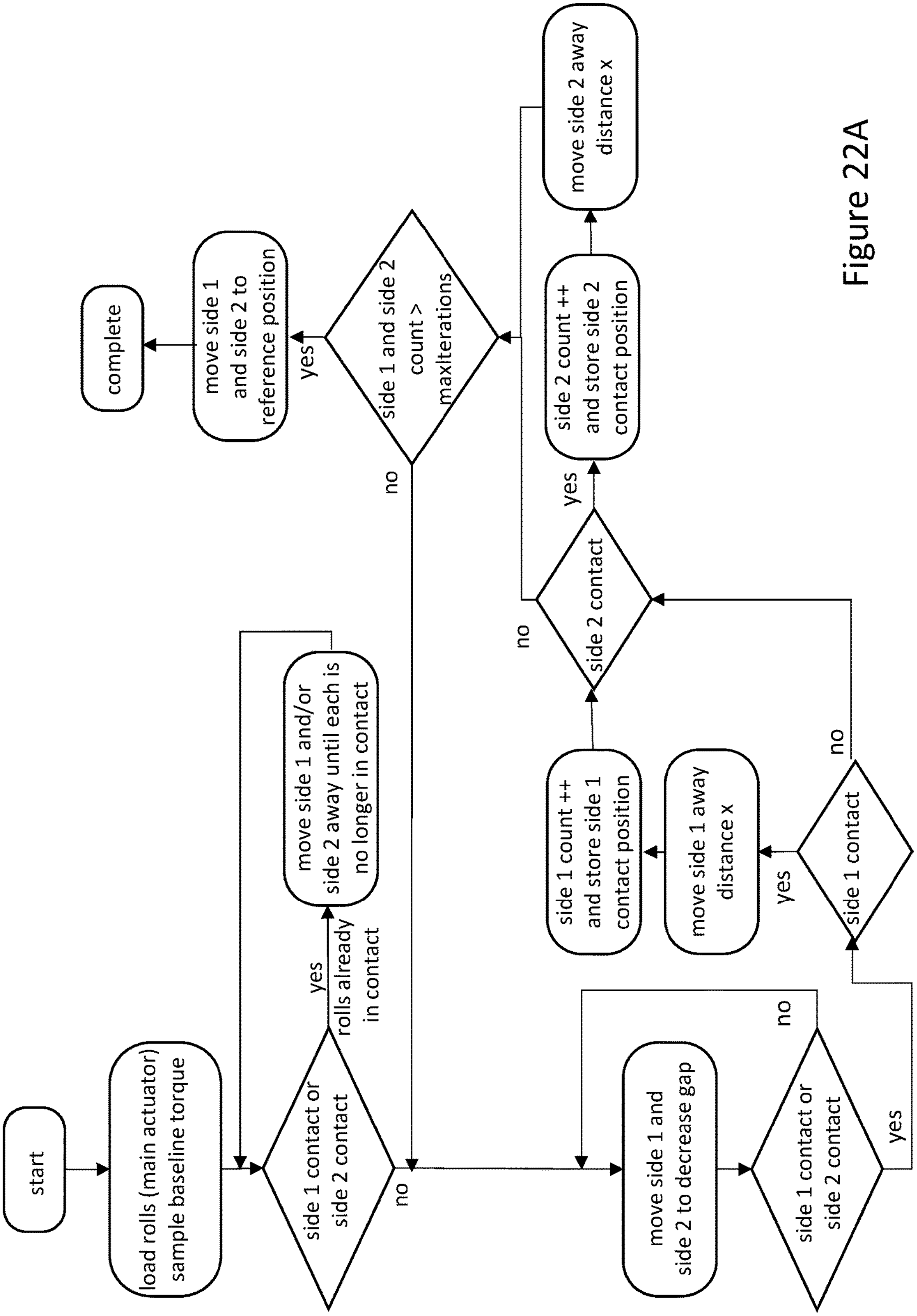
FIG. 22A is a roll calibration process flowchart using electrical continuity as a means of indicating mutual contact between rolls.

FIGS. 22A and 22B show a similar process where electrical continuity rather than instrumentation (motor torque, motor speed, electronic position sensors) is used to determine contact between the first ends of the rolls and the second ends of the rolls. So, FIG. 22A does not include steps of moving an end of the roll away and sampling motor torque to determine whether contact was made at the respective end of the roll.

Further embodiments can be envisioned by one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, various modifications and changes may be made thereunto without departing from the broader spirit and scope of the invention as set forth in the claims and that the invention is intended to cover all modifications and equivalents within the scope of the following claims.

What is claimed is:

1. A method of calibrating a distance and alignment between two rolls, wherein each of the rolls has a face, a first end, and a second end, the method comprising:

(a) moving the rolls to an initial position where the faces of the rolls are devoid of contact with each other;

(b) rotating at least one of the rolls;

(c) decreasing a distance between the first ends of the rolls and a distance between second ends of the rolls until the faces of the rolls make contact on at least one of the ends of the first and second rolls;

(d) increasing the distance between the first ends of the rolls by an incremental amount;

(e) determining contact between the faces of the rolls after the distance between the first ends of the rolls is increased by the incremental amount such that:

(I) when the faces of the rolls contact each other, the method comprises: recording the position of an actuator associated with controlling the distance between the second ends of the rolls, recording an instance of contact between the second ends of the rolls, increasing the distance between the second ends of the rolls by the incremental amount, decreasing the distance between the first ends of the rolls by the incremental amount, determining contact between the faces of the rolls such that:

(1) when the faces of the rolls contact each other, the method comprises: recording the position of an actuator associated with controlling the distance between the first ends of the rolls, recording an instance of contact between the first ends of the rolls, increasing the distance between the first ends of the rolls by the incremental amount multiplied by a factor, and performing steps (c) through (e) until the first and second ends of the rolls contact each other a threshold number of instances of contact at which point the ends of the first and second roll are moved to a respective reference position;

(2) when the faces of the rolls are devoid of contact with each other, the method comprises: performing steps (c) through (e) until the first and second ends of the rolls contact each other a threshold number of instances of contact at which point the ends of the first and second roll are moved to a respective reference position;

(II) when faces of the rolls are devoid of contact, the method comprises: recording the position of the actuator associated with controlling the distance between the first ends of the rolls, and performing steps (c) through (e) until the first and second ends of the rolls contact each other a threshold number of instances of contact at which point the ends of the first and second roll are moved to a respective reference position.

2. The method of claim 1, wherein the step (a) includes increasing the distances between the first ends and the second ends of the rolls until the faces of the rolls are devoid of contact with each other.

3. The method of claim 1 wherein the actuator associated with controlling the distance between the first ends of the rolls and the actuator associated with controlling the distance between the second ends of the rolls are operatively connected to stops delimiting the distances between the ends of the rolls.

4. The method of claim 3 further comprising generating feedback signals representative of a relative position of the stops associated with the ends of the rolls, and determining the distance between the ends of the rolls based at least in part upon a feedback signals.

5. The method of claim 1 wherein the step (a) includes setting positions of the stops associated with the respective ends of the rolls at an initial position.

6. The method of claim 1 wherein the step (e) includes determining contact between the faces of the rolls by a change in a torque during rotation of the at least one roll.

7. The method of claim 1 wherein the step (e) includes determining contact between the faces of the rolls by a change in a speed during rotation of the at least one roll.

8. The method of claim 1 wherein the step (d) includes at least one of increasing and decreasing the distance between the ends of the respective rolls by the incremental amount of between 0.13 mm and 0.25 mm.

9. The method of claim 1 wherein the step (e) includes at least one of increasing and decreasing the distance between the ends of the respective rolls by the incremental amount of between 0.13 mm and 0.25 mm.

10. The method of claim 1 wherein step (e) includes increasing the distance between the first ends of the rolls by the incremental amount multiplied by a factor of 1.5.

11. The method of claim 1 wherein steps (c)-(e) are performed until the threshold number of instances of contact for each of the respective ends of roll is three.

12. The method of claim 1 wherein step (b) includes rotating the first roll and the second roll.

* * * * *